US012329211B2

(12) United States Patent
Gill et al.

(10) Patent No.: US 12,329,211 B2
(45) Date of Patent: Jun. 17, 2025

(54) ELECTRONIC VAPOUR INHALERS WITH TEMPERATURE CONTROL

(71) Applicant: JT International S.A., Geneva (CH)

(72) Inventors: Mark Gill, London (GB); Daniel Vanko, Krpelany (SK); Lubos Brvenik, Krpelany (SK)

(73) Assignee: JT International SA (CH)

( * ) Notice: Subject to any disclaimer, the term of this patent is extended or adjusted under 35 U.S.C. 154(b) by 0 days.

(21) Appl. No.: 18/232,585

(22) Filed: Aug. 10, 2023

(65) Prior Publication Data

US 2023/0380509 A1 Nov. 30, 2023

Related U.S. Application Data

(63) Continuation of application No. 17/106,956, filed on Nov. 30, 2020, now Pat. No. 11,758,947, which is a (Continued)

(30) Foreign Application Priority Data

Nov. 11, 2014 (GB) ..................................... 1420045

(51) Int. Cl.
*A24F 40/42* (2020.01)
*A24F 40/465* (2020.01)
(Continued)

(52) U.S. Cl.
CPC .............. *A24F 40/57* (2020.01); *A24F 40/42* (2020.01); *A24F 40/465* (2020.01);
(Continued)

(58) Field of Classification Search
CPC ........ A24F 40/20; A24F 40/42; A24F 40/465; A24F 40/485; A24F 40/50; A24F 40/57; H05B 6/06
See application file for complete search history.

(56) References Cited

U.S. PATENT DOCUMENTS 5,095,921 A * 3/1992 Losee ..................... A24F 40/50
131/194
5,144,962 A * 9/1992 Counts ..................... A24D 1/20
131/194

(Continued)

FOREIGN PATENT DOCUMENTS

CA 2939874 A1 11/2015
CN 1126426 A 7/1996

(Continued)

OTHER PUBLICATIONS

Office Action issued for Japanese Patent Application No. 2017-544051, issued by the Japan Patent Office, dated May 12, 2020, with English-language translation, 6 pages.

(Continued)

*Primary Examiner* — Abdullah A Riyami
*Assistant Examiner* — Thang H Nguyen
(74) *Attorney, Agent, or Firm* — Lerner David LLP

(57) ABSTRACT

An electronic vapour inhaler includes a chamber configured so that a user can place a cartridge into said chamber, an induction coil arranged to extend around the chamber, a temperature sensor configured to measure a temperature inside the chamber, and a control arrangement arranged to control operation of the induction coil based on the temperature measured by the temperature sensor to maintain a predetermined temperature inside the chamber.

20 Claims, 9 Drawing Sheets

Related U.S. Application Data continuation of application No. 15/525,172, filed as application No. PCT/GB2015/053305 on Nov. 3, 2015, now Pat. No. 10,856,575.

(51) Int. Cl.

| | |
|---|---|
| ***A24F 40/485*** | (2020.01) |
| ***A24F 40/50*** | (2020.01) |
| ***A24F 40/51*** | (2020.01) |
| ***A24F 40/57*** | (2020.01) |
| ***H05B 6/06*** | (2006.01) |
| ***H05B 6/10*** | (2006.01) |
| *A24F 40/20* | (2020.01) |

(52) U.S. Cl.

CPC ............ *A24F 40/485* (2020.01); *A24F 40/50* (2020.01); *H05B 6/06* (2013.01); *H05B 6/105* (2013.01); *A24F 40/20* (2020.01)

(56) References Cited

U.S. PATENT DOCUMENTS

| | | | | |
|---|---|---|---|---|
| 5,338,497 | A * | 8/1994 | Murray .................. | B29C 33/08 264/486 |
| 5,613,505 | A * | 3/1997 | Campbell ............. | H05B 6/365 131/194 |
| 5,649,554 | A * | 7/1997 | Sprinkel ............... | A24F 40/465 131/194 |
| 5,878,752 | A | 3/1999 | Adams et al. | |
| 6,053,176 | A | 4/2000 | Adams et al. | |
| 9,572,373 | B2 * | 2/2017 | Chen ..................... | A61M 15/06 |
| 9,820,512 | B2 * | 11/2017 | Mironov ................ | A24F 40/42 |
| 9,943,114 | B2 * | 4/2018 | Batista .................... | A24F 40/70 |
| 10,272,170 | B2 * | 4/2019 | Dubief .................. | A24F 40/485 |
| 2002/0078956 | A1 | 6/2002 | Sharpe et al. | |
| 2004/0149737 | A1 * | 8/2004 | Sharpe .................. | A24F 40/465 219/635 |
| 2007/0125765 | A1 | 6/2007 | Nelson | |
| 2007/0221668 | A1 | 9/2007 | Baarman et al. | |
| 2008/0092912 | A1 | 4/2008 | Robinson et al. | |
| 2009/0139980 | A1 | 6/2009 | Acero Acero et al. | |
| 2011/0226236 | A1 | 9/2011 | Buchberger | |
| 2011/0277760 | A1 | 11/2011 | Terry et al. | |
| 2012/0174914 | A1 | 7/2012 | Pirshafiey et al. | |
| 2014/0182608 | A1 * | 7/2014 | Egoyants .......... | A61M 15/0091 131/328 |
| 2014/0334802 | A1 * | 11/2014 | Dubief ...................... | A61L 9/03 392/390 |
| 2014/0338686 | A1 | 11/2014 | Plojoux et al. | |
| 2015/0059780 | A1 * | 3/2015 | Davis ...................... | A24F 40/46 392/386 |
| 2015/0223520 | A1 * | 8/2015 | Phillips ................ | A61M 11/047 131/328 |
| 2015/0272219 | A1 * | 10/2015 | Hatrick .................... | A24D 1/20 131/328 |
| 2015/0320116 | A1 | 11/2015 | Bleloch et al. | |
| 2017/0055585 | A1 * | 3/2017 | Fursa ...................... | A24F 40/46 |
| 2017/0064996 | A1 * | 3/2017 | Mironov ................ | A24B 15/12 |
| 2017/0071250 | A1 * | 3/2017 | Mironov ................ | H05B 6/108 |
| 2017/0079325 | A1 * | 3/2017 | Mironov .................. | A24B 3/14 |
| 2017/0079326 | A1 * | 3/2017 | Mironov ................ | H05B 6/108 |
| 2017/0119054 | A1 * | 5/2017 | Zinovik ................... | H05B 6/02 |
| 2017/0129346 | A1 * | 5/2017 | Gaspard .................. | H02M 7/44 |
| 2017/0143041 | A1 * | 5/2017 | Batista ...................... | A24F 1/00 |
| 2017/0143042 | A1 * | 5/2017 | Batista .................... | A24F 40/42 |
| 2017/0144827 | A1 * | 5/2017 | Batista .................... | A24F 40/42 |
| 2017/0156403 | A1 * | 6/2017 | Gill ........................ | H05B 6/108 |
| 2019/0098931 | A1 * | 4/2019 | Leadley ................ | A61M 15/06 |
| 2022/0312854 | A1 * | 10/2022 | Boham .................. | A24F 40/20 |

FOREIGN PATENT DOCUMENTS

| | | | | |
|---|---|---|---|---|
| CN | 103002613 | A | 3/2013 | |
| CN | 103202540 | A | 7/2013 | |
| CN | 103974637 | A | 8/2014 | |
| CN | 104135881 | A | 11/2014 | |
| DE | 202013100606 | U1 | 2/2013 | |
| EP | 1708545 | A2 | 10/2006 | |
| EP | 2399636 | A1 | 12/2011 | |
| EP | 2444112 | A1 | 4/2012 | |
| EP | 2503912 | A1 | 10/2012 | |
| EP | 3142503 | A1 | 3/2017 | |
| EP | 3145340 | A1 | 3/2017 | |
| ES | 2361908 | T3 | 6/2011 | |
| GB | 2504730 | A | 2/2014 | |
| GB | 2504732 | A | 2/2014 | |
| GB | 2527597 | A | 12/2015 | |
| JP | H06315366 | A | 11/1994 | |
| JP | H08511175 | A | 11/1996 | |
| JP | 2012529936 | A | 11/2012 | |
| WO | 9406314 | A1 | 3/1994 | |
| WO | 9409842 | A1 | 5/1994 | |
| WO | 9527411 | A1 | 10/1995 | |
| WO | 9920940 | A1 | 4/1999 | |
| WO | 2011063970 | A1 | 6/2011 | |
| WO | 2013083634 | A1 | 6/2013 | |
| WO | 2014023964 | A1 | 2/2014 | |
| WO | 2014023965 | A1 | 2/2014 | |
| WO | 2014048745 | A1 | 4/2014 | |
| WO | 2014102091 | A1 | 7/2014 | |
| WO | 2015131058 | A1 | 9/2015 | |
| WO | 2015175568 | A1 | 11/2015 | |
| WO | 2015176898 | A1 | 11/2015 | |
| WO | 2015177046 | A1 | 11/2015 | |
| WO | 2015177247 | A1 | 11/2015 | |
| WO | 2015177252 | A1 | 11/2015 | |
| WO | 2015177294 | A1 | 11/2015 | |
| WO | WO-2015177255 | A1 * | 11/2015 | ........... A24B 15/167 |
| WO | WO-2015177265 | A1 * | 11/2015 | ............. A24B 15/12 |

OTHER PUBLICATIONS

Communication of a notice of opposition by Phillip Morris Products, S.A. for European Patent Application No. EP17170100.6, dated Feb. 19, 2020, from the European Patent Office, 52 pages.

Communication of a notice of opposition by Nicoventures Trading Limited for European Patent Application No. EP17170100.6, dated Feb. 20, 2020, from the European Patent Office, 28 pages.

Extract for EP3145343, from the Register of European Patents, 2 pages.

Compact Oxford English Dictionary, Oxford University Press, printed by L.E.G.O. S.p.A, Italy, p. 146 (2013).

Compact Oxford English Dictionary, Oxford University Press, printed by L.E.G.O. S.p.A, Italy, pp. 326 and 327 (2013).

"Inductive Proximity Sensors" published in the Red Lions Controls, York, PA, Bulletin No. PSAB-A (2005).

Second Office Action issued for Chinese Application No. 201580061228.4, issued by the China National Intellectual Property Administration, dated Nov. 18, 2019, with English-language translation, 10 pages.

Office Action issued for Japanese Patent Application No. 2017-544051, issued by the Japan Patent Office, dated Sep. 10, 2019, with English-language translation, 12 pages.

First Office Action issued for Chinese Application No. 201580061228.4, issued by the Chinese State Intellectual Property Office, dated Mar. 11, 2019, with English-language translation, 13 pages.

Search Report under Section 17 for Great Britain Application No. GB1900774.9, published by the United Kingdom Intellectual Property Office, date of search Mar. 7, 2019, 2-pages.

Search Report under Section 17 for Great Britain Application No. GB1820259.8, published by the United Kingdom Intellectual Property Office, date of search Dec. 31, 2018.

Search Report for Application No. GB1710794.7, published by the United Kingdom Intellectual Property Office, date of search Dec. 22, 2017.

International Search Report (Form PCT/ISA/210) for PCT/GB2015/053305, issued from the European Patent Office, dated Feb. 15, 2016, 6 pages.

(56) References Cited

OTHER PUBLICATIONS

Written Opinion of the International Searching Authority (Form PCT/ISA/237) for PCT/GB2015/053305, issued from the European Patent Office, dated Feb. 15, 2016, 8 pages.
Search Report for Application No. GB1420045.5, issued from the UK Intellectual Property Office, date of report Mar. 24, 2016.
Search Report dated Jun. 30, 2023 from Office Action for Chinese Application No. 2020112710806 issued Jul. 5, 2023. 3 pgs. (see p. 1-2, categorizing the cited references).
Notice of Opposition for Application No. EP 20205553.9 dated Feb. 27, 2025, pp. 1-46.
Opposition Division's Decision in respect of the Opposition against EP3245886 dated Feb. 2, 2023, 1 page.
Datasheet for the Decision of Jun. 7, 2024 of the Boards of Appeal against EP3248381 dated Jul. 17, 2024, 1 page.

* cited by examiner

Fig. 4b
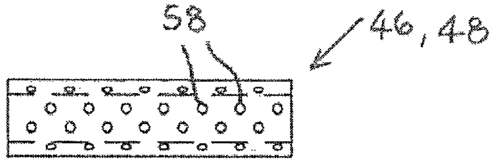
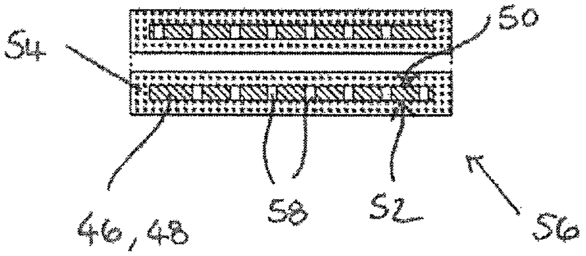
Fig. 4a

ELECTRONIC VAPOUR INHALERS WITH TEMPERATURE CONTROL

CROSS-REFERENCE TO RELATED APPLICATIONS

The present application is a continuation of U.S. patent application Ser. No. 17/106,956, filed Nov. 30, 2020, which is a continuation of U.S. patent application Ser. No. 15/525,172, filed May 8, 2017, which is a national phase entry under 35 U.S.C. § 371 of International Application No. PCT/GB2015/053305, filed Nov. 3, 2015, published in English, which claims priority to Great Britain Application No. 1420045.5 filed Nov. 11, 2014, the disclosures of which are incorporated herein by reference.

TECHNICAL FIELD

The present disclosure relates generally to electronic vapour inhalers and more particularly to a cartridge having a flavour-release medium for use with an electronic vapour inhaler, in which the flavour-release medium can be heated to produce a vapour for inhalation by a user.

TECHNICAL BACKGROUND

The use of electronic vapour inhalers (also known as electronic, cigarettes, e-cigarettes and personal vaporisers), which can be used as an alternative to conventional smoking articles such as cigarettes, cigars, and pipes, is becoming increasingly popular and widespread. Electronic vapour inhalers, which are usually battery powered, heat and atomise a liquid containing nicotine, to produce a nicotine-containing vapour which can be inhaled by a user. The vapour is inhaled through a mouthpiece to deliver nicotine to the lungs, and vapour exhaled by the user generally mimics the appearance of smoke from a conventional smoking article. Although inhalation of the vapour creates a physical sensation which is similar to conventional smoking, harmful chemicals such as carbon monoxide and tar, are not produced or inhaled because there is no combustion.

Various electronic vapour inhalers are currently available but they all have drawbacks associated with them which the present disclosure seeks to overcome.

SUMMARY OF THE DISCLOSURE

According to a first aspect of the present disclosure, there is provided a cartridge for an electronic vapour inhaler, the cartridge comprising:

an elongate induction heatable element; and a flavour-release medium adhered to the surface of the elongate induction heatable element.

The cartridge provides a convenient way for a user to load the flavour-release medium into the electronic vapour inhaler, thereby reducing the likelihood of spillage and waste. The integrity, safety and quality of the flavour-release medium can also be assured, because it is provided in the form of a pre-manufactured cartridge. Correct dosing of the flavour-release medium is also assured.

By arranging the induction heatable element in close proximity to the flavour-release medium and in contact with at least some of it, the flavour—release medium is heated rapidly and efficiently in the presence of an electromagnetic field and this gives a fast heating response with a relatively low power requirement. The cartridge does not have any moving parts and the heating element is disposed along with the cartridge. The heating element does not wear out and is not subject to a build-up of residue formed by deposits from the heated flavour-release medium because it is renewed each time the cartridge is replaced and there is, therefore, no reduction in performance or degradation in flavour or aroma over time. This is to be contrasted, for example, with existing electronic vapour inhalers which have a resistance heating element in the housing of the inhaler which wears out or fails after a certain amount of use and which is subject to the build-up of residue as the flavour—release medium is heated. In the event of failure, the electronic vapour inhaler may need to be discarded entirely and replaced with a new one.

The flavour-release medium may be any material or combination of materials which can be heated to release a vapour for inhalation by a user. The flavour-release medium may be tobacco or a tobacco material and may be impregnated with a vapour-forming medium such as propylene glycol or glycerol. The flavour—release medium is not, however, limited to tobacco and any flavour-release medium could be used.

The flavour-release medium may be adhered to an outer surface of the elongate induction heatable element. The flavour release medium may, for example, comprise a granulated material which may be adhered to the outer surface of the induction heatable element. The flavour-release medium can, therefore, be attached to the induction heatable element in a simple manner.

The elongate induction heatable element may comprise a rod or a wire which may have a solid cross-section.

The elongate induction heatable element may alternatively comprise a tube having a wall with an inner wall surface and an outer wall surface. The tube may, for example, be cylindrical or elliptical and the wall may be a circumferentially extending wall having an inner circumferential wall surface and an outer circumferential wall surface. The flavour release medium may be adhered to the inner wall surface and/or the outer wall surface. In arrangements where the flavour-release medium is adhered to both the inner and outer wall surfaces of the tubular induction heatable element, an increased amount of flavour and aroma may be released.

The tubular induction heatable element may comprise one or more openings in the wall to allow air and gases to flow therethrough. For example, the tubular induction heatable element could comprise a tubular mesh or a tubular perforated foil.

The cartridge may further comprise a thermally-insulating layer between the induction heatable element and the flavour-release medium. The thermally-insulating layer may usefully slow down the rate at which the flavour-release medium is heated.

According to a second aspect of the present disclosure, there is provided a cartridge for an electronic vapour inhaler, the cartridge comprising:

an elongate induction heatable element having a solid cross-section; and a flavour-release medium surrounding the elongate induction heatable element.

The elongate induction heatable element may comprise a rod or may comprise one or more wires.

The cartridge may include a protective sleeve which surrounds the flavour-release medium. The use of a protective sleeve may be advantageous in arrangements where the flavour-release medium comprises a fibrous material or is in the form of fine pieces or pellets or a granulated material, in order to hold the flavour-release medium in position around the elongate induction heatable element.

The protective sleeve may comprise a thermally-insulating material which may also be electrically-insulating and which may be non-magnetic. The protective sleeve could comprise a paper overwrap.

The protective sleeve may be tubular and may have open ends. The protective sleeve could, for example, be circular or elliptical in cross-section.

The elongate induction heatable element and the tubular protective sleeve may be concentric.

The cartridge may further comprise a thermally-insulating layer between the induction heatable element and the flavour-release medium.

According to a third aspect of the present disclosure, there is provided a cartridge for an electronic vapour inhaler, the cartridge comprising:

- a tubular induction heatable element; and
- a flavour-release medium provided exclusively to surround the tubular induction heatable element whereby the interior of the tubular induction heatable element is devoid of said flavour-release medium.

The tubular induction heatable element may comprise one or more openings in a wall thereof surrounded by the flavour-release medium to allow air and gases to flow through the wall. For example, the tubular induction heatable element could comprise a tubular mesh or a tubular perforated foil.

The cartridge may include a protective sleeve surrounding the flavour-release medium.

The protective sleeve may comprise a thermally-insulating material which may also be electrically-insulating and which may be non-magnetic. The protective sleeve could comprise a paper overwrap.

The protective sleeve may be tubular and may have open ends. The protective sleeve could, for example, be circular or elliptical in cross-section.

The tubular induction heatable element and the tubular protective sleeve may be concentric.

The cartridge may further comprise a thermally-insulating layer between the induction heatable element and the flavour-release medium.

According to a fourth aspect of the present disclosure, there is provided a cartridge for an electronic vapour inhaler, the cartridge comprising a flavour-release medium and an induction heatable material dispersed throughout the flavour-release medium.

The induction heatable material may be a particulate material. The particles are individually heated in the presence of an electromagnetic field and heat is transferred locally from the heated particles to the flavour-release medium. Rapid and effective heating of the flavour-release medium is, therefore, readily achieved.

The cartridge may include a protective sleeve surrounding the interspersed flavour-release medium and induction heatable material.

The protective sleeve may comprise a thermally-insulating material which may also be electrically-insulating and which may be non-magnetic. The protective sleeve could comprise a paper overwrap.

The protective sleeve may be tubular and may have open ends. The protective sleeve could, for example, be circular or elliptical in cross-section.

According to a fifth aspect of the present disclosure, there is provided an electronic vapour inhaler comprising:

- a housing having a proximal end and a distal end;
- a mouthpiece at the proximal end of the housing;
- a cartridge according to the present disclosure disposed in the housing; and
- an induction heating arrangement arranged to inductively heat the induction heatable element and thereby heat the flavour-release medium.

The housing may include a chamber in which the cartridge is removably disposed. The chamber may be thermally isolated from the external environment. The chamber could be located at any suitable position between the distal end and the proximal end of the housing. In some embodiments, the chamber could be located at the proximal end. In other embodiments, the chamber could be located at the distal end. In the latter case, even if there is a slight increase in temperature at the outer surface of the housing as the cartridge is heated during operation of the induction heating arrangement, this increase in temperature would not occur at the proximal end of the housing where the mouthpiece is located.

The induction heating arrangement may comprise an induction coil. The induction coil may extend around the chamber.

The housing may include an air inlet through which air can flow into the chamber. A plurality of air inlets could be provided.

The housing may be fitted with an airflow control mechanism to vary the airflow through the or each air inlet and, hence, through the cartridge. This might allow a user to influence the amount of flavour and aroma released from the heated flavour-release medium during inhalation through the mouthpiece.

The housing may include a conduit for delivering heated flavour-release medium to the mouthpiece. The conduit may include at least one first inlet for ambient air and at least one second inlet for heated air from the chamber. The conduit may be arranged to provide a venturi effect, so that the heated air is sucked into the conduit from the chamber by the venturi effect as ambient air flows through the conduit past the at least one second inlet. With such an arrangement, relatively cool ambient air and relatively hot air from the chamber are mixed together as they flow through the conduit and this may provide a more gradual release of flavour and aroma during inhalation through the mouthpiece. The housing may be fitted with an airflow control mechanism to vary the flow through the at least one first inlet. The conduit is typically an annular conduit which surrounds the chamber. The annular conduit may, include a plurality of circumferentially spaced first inlets formed in the housing and a plurality of circumferentially spaced second inlets formed in a circumferential wall of the chamber.

The electronic vapour inhaler may include one or more temperature sensors to determine the cartridge temperature. Any suitable temperature sensor could be used, for example a thermocouple, a resistance temperature detector, a thermistor or an infra-red sensor. In one implementation, the temperature sensor(s) may determine the cartridge temperature by direct measurement of the cartridge temperature. In another implementation, the temperature sensor(s) may be used to determine the cartridge temperature indirectly. For example, a temperature sensor could be used to measure the temperature of the airflow into the chamber through the or each air inlet and the cartridge temperature could then be determined mathematically as a function of the measured air inlet temperature, the properties of the cartridge and the amount of energy supplied by the induction heating arrangement.

The electronic vapour inhaler may include a control arrangement which may be arranged to energise the induction heating arrangement to maintain the cartridge at a substantially constant and predetermined temperature. The control arrangement could be arranged to energise the induction heating arrangement based on the determined temperature, thus creating a closed-loop feedback control arrangement. It should, however, be understood that the temperature control could be effected without using a temperature sensor.

According to a sixth aspect of the present disclosure, there is provided an electronic vapour inhaler comprising:

a housing having a mouthpiece at one end;

an induction heating arrangement arranged to inductively heat an induction heatable element of a cartridge or capsule inserted into the housing to heat a flavour-release medium within the cartridge or capsule;

a control arrangement which is arranged to energise the induction heating arrangement to inductively heat the induction heatable element and thereby heat the flavour-release medium;

the control arrangement being arranged to recognise an inserted capsule or cartridge by detecting a characteristic of the induction heatable element and to control the operation of the induction heating arrangement based on the detected characteristic.

The induction heatable element is effectively 'read' as a cartridge or capsule is inserted into the housing thereby providing automatic recognition of the cartridge or capsule.

The control arrangement may be arranged to control the operation of the induction heating arrangement, based on the detected characteristic, to provide a desired heating profile. The heating profile can, therefore, be set automatically upon recognition of a cartridge or capsule so that the flavour-release medium is heated in an optimum manner to release the flavour and aroma therefrom.

The control arrangement may be adapted to detect a change in the electromagnetic field generated by the interaction between the induction heatable element and the induction heating arrangement during insertion of a cartridge or capsule into the housing.

The cartridge may be as defined above. In this case, the characteristic to be detected, such as the change in the electromagnetic field, could be varied between different cartridges for example by providing induction heatable elements of differing length, thickness or shape.

BRIEF DESCRIPTION OF THE DRAWINGS

FIG. 4*a* is a view of a cartridge similar to the cartridge shown in FIG. 3 but having a perforated tubular induction heatable element and FIG. 4*b* is a side view of the perforated tubular induction heatable element;

DETAILED DESCRIPTION OF EMBODIMENTS

Embodiments of the present disclosure will now be described by way of example only and with reference to the accompanying drawings.

Figure 1:
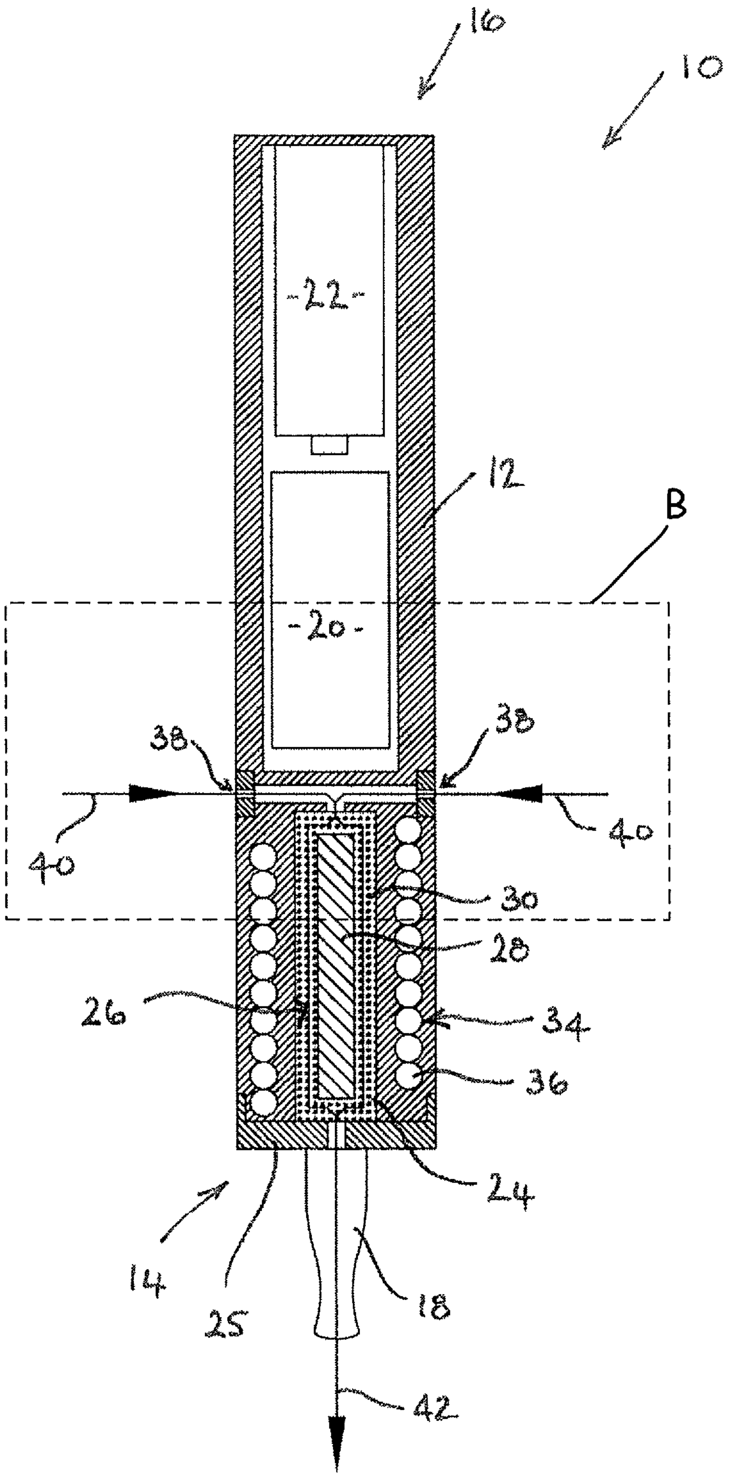
FIG. 1 is diagrammatic cross-sectional view of an electronic vapour including a cartridge according to the present disclosure having an elongate rod-like induction heatable element with flavour-release medium adhered to its outer surface.

Referring initially to FIG. 1, an electronic vapour inhaler 10 comprises a generally elongate housing 12 having a proximal end 14 and a distal end 16. The electronic vapour inhaler 10 includes a mouthpiece 18 at the proximal end 14 through which a user can inhale vapour generated by heating a flavour-release medium 30. The electronic vapour inhaler 10 includes a control arrangement 20, e.g. in the form of a microprocessor, and a power source 22 in the form of one or more batteries which could, for example, be inductively rechargeable.

The housing 12 includes a chamber 24 into which a cartridge 26 can be removably inserted. The chamber 24 is located at the proximal end 16 of the housing 12 adjacent to the mouthpiece 18, but this is not strictly necessary and it could be located at any suitable position between the proximal end 14 and the distal end 16. In the illustrated embodiment, the chamber 24 is formed in the housing 12 and is accessed by removing a cover 25, with which the mouthpiece 18 is integrally formed, from the proximal end 14 of the housing 12. In alternative embodiments, the chamber 24 could itself be formed as a removable component and could be accessed by removing the component from the housing 12. Either way, a cartridge 26 can be easily inserted into, or removed from, the chamber 24.

Figure 2:
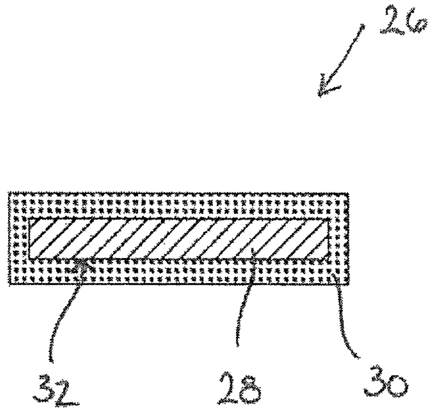
FIG. 2 is a cross-sectional side view of the cartridge shown in FIGS. 1 and 2.

The cartridge 26, which is shown separately in FIG. 2 for clarity purposes, comprises an elongate induction heatable element 28 in the form of a rod which is typically, but not exclusively, circular in cross-section. The cartridge 26 further comprises a flavour-release medium 30 which is adhered, e.g. as a coating, to the surface 32 of the induction heatable element 28. The flavour-release medium 30 is a granulated or particulate material which may be treated or processed to enable it to adhere to the induction heatable element 28. The flavour-release medium 30 typically comprises tobacco or a tobacco material which may be impregnated with a vapour-forming medium, such as propylene glycol or glycerol, so that it can be heated to produce a vapour for inhalation by a user through the mouthpiece 18 of the electronic vapour inhaler 10. When tobacco or a tobacco material is used, the electronic vapour inhaler 10 can be used as an electronic cigarette. Materials other than tobacco can, however, be used as explained earlier in this specification.

The induction heatable element 28 is in intimate contact with the flavour-release medium 30 due to the fact that the flavour-release medium 30 is adhered to it. As a result, when the induction heatable element 28 is heated in the presence of an electromagnetic field, the flavour-release medium 30 is heated rapidly and uniformly.

Referring again to FIG. 1, the electronic vapour inhaler 10 includes an induction heating arrangement 34 comprising an induction coil 36 which can be energised by the power source 22. As will be understood by those skilled in the art, when the induction coil 36 is energised, an electromagnetic field is produced which generates eddy currents in the induction heatable element 28 causing it to heat up. The heat is then transferred from the induction heatable element 28 to the flavour-release medium 30, for example by conduction, radiation and convection.

The operation of the induction heating arrangement 34 is controlled by the control arrangement 20 typically in order to maintain the flavour-release medium 30 at a temperature which is optimised for the release of flavour and aroma therefrom.

Although not shown in FIG. 1, the electronic vapour inhaler 10 can include a temperature sensor to measure the temperature inside the chamber 24 and in this case the control arrangement 20 can be arranged to control the operation of the induction heating arrangement 34 based on the temperature measured by the temperature sensor. As shown in FIG. 1*b*, the temperature sensor 23 can be arranged to measure the temperature of the airflow into the chamber 24 through the or each air inlet 38. Other arrangements for determining the temperature inside the chamber 24 are, however, possible as described earlier in this specification.

When a user wishes to use the electronic vapour inhaler 10 to inhale vapour, the user may initially need to gain access to the chamber 24, for example by removing the cover 25 from the proximal end 14 of the housing 12 (e.g. by unscrewing it). The user then places a pre-manufactured cartridge 26 into the chamber 24. Pre—manufactured cartridges 26 are typically supplied in a pack which can be purchased separately. Loading the cartridge 26 into the chamber 24 is, therefore, a very simple procedure for the user.

The user then closes the chamber 24, for example by re-attaching the cover 25 to the proximal end 14 of the housing 12 (e.g. by screwing it back on to the housing 12).

The electronic vapour inhaler 10 can then be switched on by the user ready for use, thereby energising the induction coil 36 and heating the induction heatable element 28 and the flavour—release medium 30 as described above such that the flavour-release medium 30 is heated without being combusted.

When a user places their mouth over the mouthpiece 18 and inhales, ambient air is drawn through air inlets 38 into the chamber 24, as denoted by the arrows 40. The air is heated as it flows through the granulated or particulate flavour-release medium 30 in the chamber 24 and heated air with a suitable aroma and flavour flows out of the chamber 24. The heated air then flows through the mouthpiece 18 and, in doing so, it cools and condenses to form a vapour or aerosol which can be inhaled by a user through the mouthpiece 18, as denoted by the arrow 42. The control arrangement 20 could include a temperature selector 21 to allow a user to select the desired vapour inhalation temperature to select the desired user experience, since the optimum inhalation temperature may be a matter of personal choice.

During inhalation, and as air flows into and through the chamber 24, it will be understood that the induction coil 36 can be energised as necessary to maintain a predetermined, e.g. substantially constant, temperature inside the chamber 24. This in turn ensures that the temperature of the vapour inhaled by the user through the mouthpiece 18 is optimised, e.g. substantially constant. However, in order to preserve the flavour-release medium 30, the control arrangement 20 can be arranged to control the induction heating arrangement 34 so that the induction coil 36 is energised in such a way that the temperature inside the chamber 24 decreases between inhalation cycles and increases immediately—before, or at the start of, the next inhalation cycle.

When the flavour and aroma of the vapour supplied to the mouthpiece 18 has reached a level which is considered by a user to be unacceptable, the chamber 24 can be accessed, for example by removing the cover 25 from the proximal end 14 of the housing 12. The used cartridge 26 can then be removed and discarded, and a new cartridge 26 can be placed in the chamber 24 before the cover 25 is replaced as described above to ready the electronic vapour inhaler 10 for use.

It will be appreciated that the contents of the cartridge 26, and in particular the constituents of the flavour-release medium, may vary and that the operation of the induction heating arrangement 34 may ideally need to be varied to optimise the release of flavour and aroma from the flavour-release medium. For example, the contents of certain cartridges 26 may favour a heating profile with a relatively slow heating rate whereas the contents of other cartridges 26 may favour a heating profile with a relatively rapid heating rate. In order to accommodate this, in one embodiment the control arrangement 20 is arranged to recognise an inserted cartridge 26 by detecting a characteristic of the induction heatable element 28 and to control the operation of the induction heating arrangement 34, e.g. to provide a desired heating profile, based on the detected characteristic. In one possible implementation, as a cartridge 26 is inserted into the chamber 24, the control arrangement 20 detects a change in the electromagnetic field generated by the interaction between the induction heatable element 28 and the induction coil 36. In practice, different electromagnetic field signatures can be provided for different cartridges 26 by providing one or more induction heatable elements 28 of different length, thickness or shape.

Figure 1A:
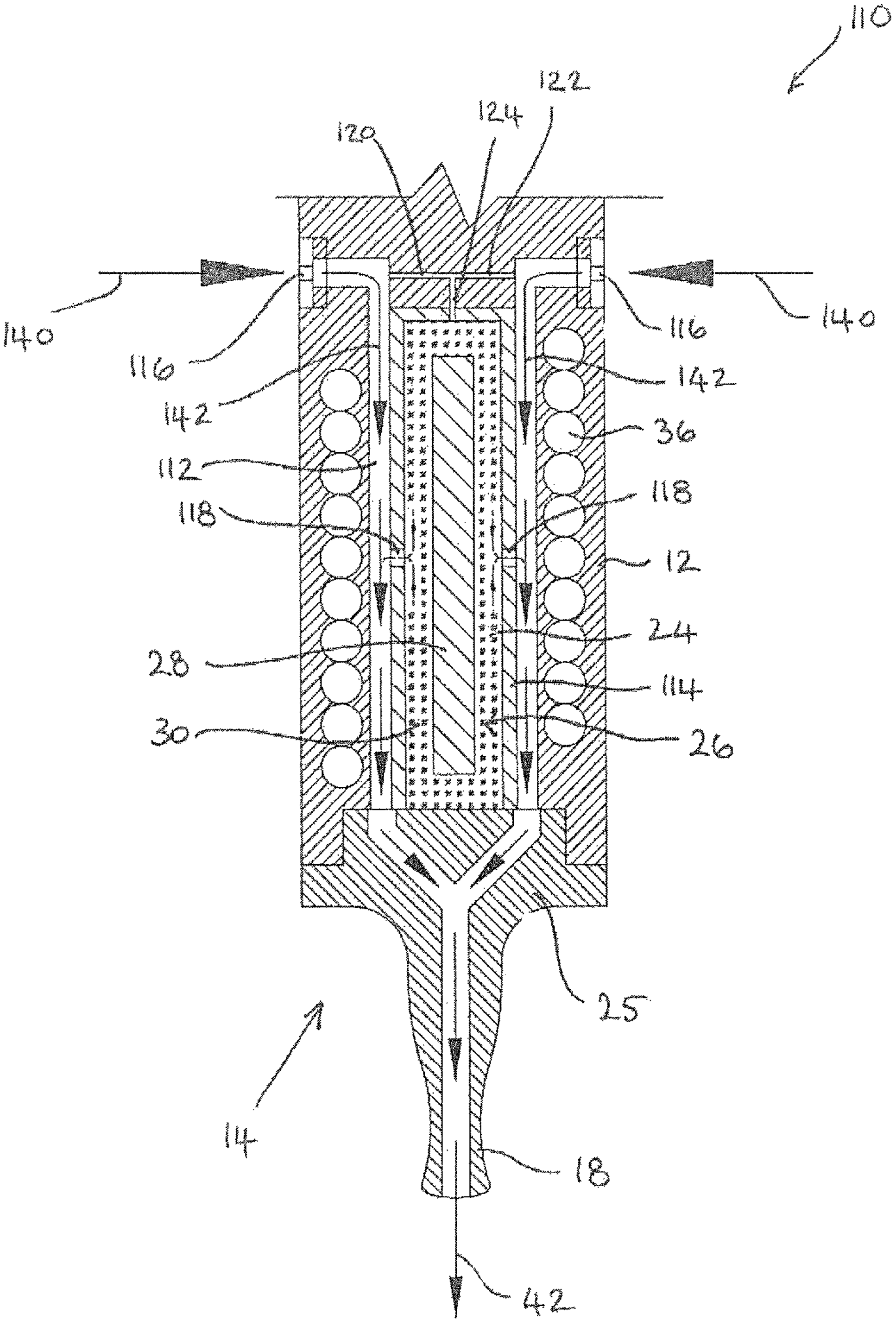
FIG. 1*a* is a view similar to FIG. 1, showing part of an alternative embodiment of an electronic vapour inhaler.
Figure 1B:
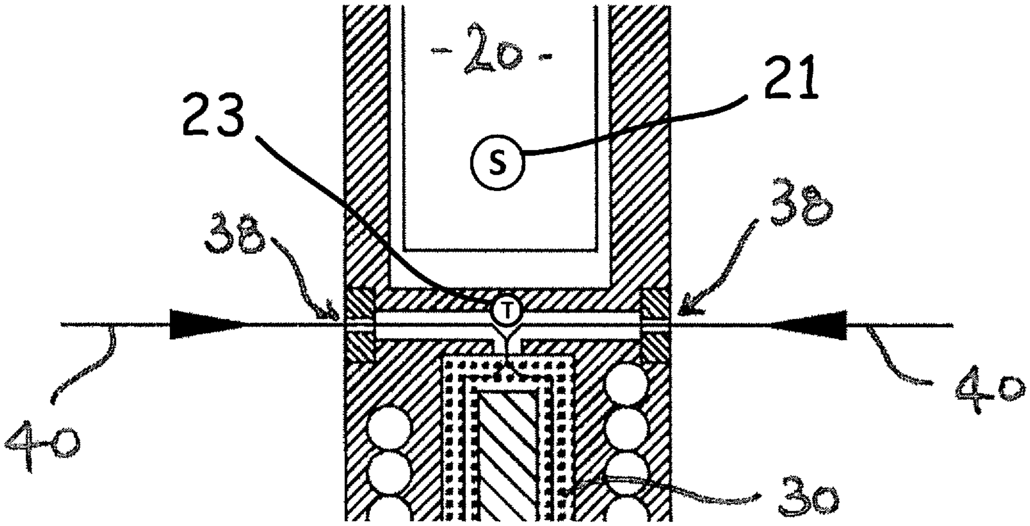
FIG. 1*b* is an enlarged view of region B in FIG. 1.

FIG. 1*a* shows an alternative embodiment of part of an electronic vapour inhaler 110. The electronic vapour inhaler 110 shares many features in common with the electronic vapour inhaler 10 shown in FIG. 1 and corresponding features are, therefore, designated with corresponding reference numerals.

The electronic vapour inhaler 110 has an annular conduit 112 which surrounds the chamber 24. The annular conduit 112 is formed between a circumferential wall of the housing 12 in which the induction coil 36 is embedded and a circumferential wall 114 of the chamber 24. The annular conduit 112 includes a plurality of circumferentially spaced first inlets 116 formed in the housing 12 at the distal end of the annular conduit 112 to enable ambient air to flow into the annular conduit 112. The annular conduit 112 also includes a plurality of circumferentially spaced second inlets 118 which are formed in the circumferential wall 114 of the chamber 24 to enable heated air to flow from the chamber 24 into the annular conduit 112. The second inlets 118 are formed in the circumferential wall 114 roughly at the midpoint of the annular conduit 112, between the distal and proximal ends thereof, but other positions are of course entirely feasible and within the scope of the present disclosure. Circumferentially spaced passages 120, 122 are also provided in the housing 12 to direct a proportion of ambient air from the first inlets 116 along passage 124 and into the chamber 24.

During inhalation through the mouthpiece 18, ambient air is drawn through the circumferentially spaced first inlets 116 into the annular conduit 112, as shown by the arrows 140. The ambient air flows along the annular conduit 112, from the distal end towards the proximal end, towards the mouthpiece 18 as shown by the arrows 142. As the air flows past the circumferentially spaced second inlets 118 in the chamber wall 114, a venturi effect occurs. This causes ambient air to be drawn through the passages 120, 122, 124 into the chamber 24 and to be sucked out of the chamber 24 through the second inlets 118, as shown by the dotted arrows. As will be understood, the air entering the chamber through the passages 120, 122, 124 is heated as it flows through the granulated or particulate flavour-release medium 30 in the chamber 24 and, accordingly, heated air with a suitable aroma and flavour is sucked out of the chamber 24 through the second inlets 118. The heated air mixes with the ambient air flowing through the annular conduit 112 and this tends to reduce the temperature of the heated air to a more acceptable level. The heated air then cools further and condenses to form a vapour or aerosol which can be inhaled by a user through the mouthpiece 18, as denoted by the arrow 42.

Alternative cartridges can be used with the electronic vapour inhalers 10, 110, or indeed other suitably configured electronic vapour inhalers, as will now be described.

Figure 3:
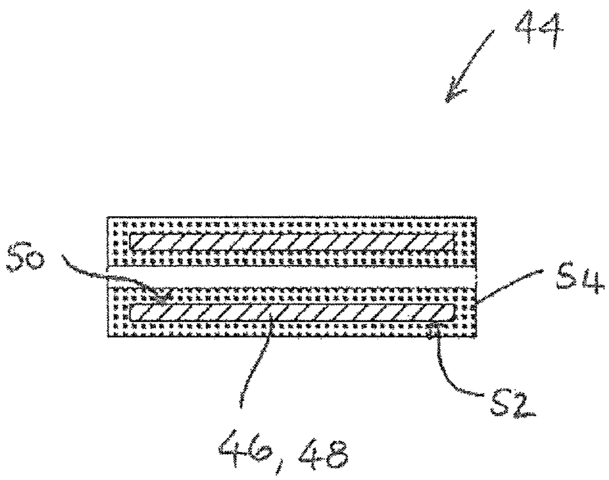
FIG. 3 is a diagrammatic cross-sectional side view of a cartridge having a tubular induction heatable element with flavour-release medium adhered to inner and outer wall surfaces.

Referring to FIG. 3, there is shown a cartridge 44 comprising a tubular (possibly cylindrical) induction heatable element 46. The tubular induction heatable element 46 has a wall 48 with inner and outer wall surfaces 50, 52 and flavour-release medium 54 is adhered to both the inner and outer wall surfaces 50, 52. In other embodiments, the flavour-release medium 54 could be adhered to just one of the inner and outer wall surfaces 50, 52.

FIGS. 4*a* and 4*b* show a cartridge 56 similar to the cartridge 44 of FIG. 3 and in which corresponding components are identified using corresponding reference numerals. In the cartridge 56 of FIGS. 4*a* and 4*b*, the tubular induction heatable element 46 (which is cylindrical in the illustrated embodiment) includes perforations 58 so that air can flow through the wall 48 between the inner and outer wall surfaces 50, 52.

Figure 5:
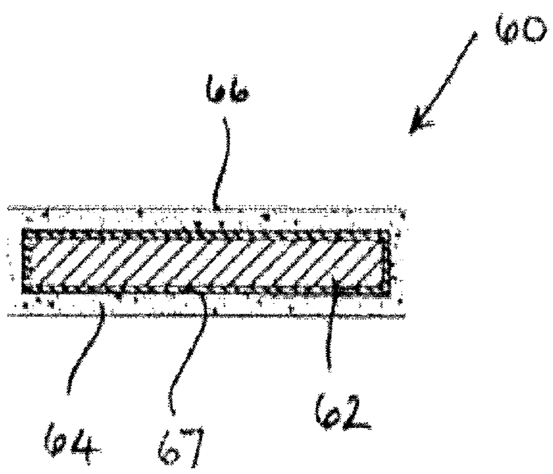
FIG. 5 is a diagrammatic cross-sectional side view of a cartridge having an elongate rod-like induction heatable element with flavour-release medium surrounding it.

Referring now to FIG. 5, there is shown a cartridge 60 comprising an elongate induction heatable element 62 in the form of a rod which is typically, but not exclusively, circular in cross-section. The cartridge 60 further comprises a flavour-release medium 64 which surrounds the induction heatable element 62, and a layer of thermally-insulating material 67 between the induction heatable element 62 and the flavour-release medium 64. A thermally-insulating, electrically-insulating and non—magnetic protective sleeve 66, for example in the form of a paper overwrap having open ends, surrounds the flavour-release medium 64 and may advantageously hold it in position, in particular if the flavour-release medium 64 comprises fine pieces or particles of material. In other embodiments, the flavour-release medium 64 can comprise interwoven fibres and this may be sufficient to retain the fibrous flavour-release medium 64 in position around the induction heatable element 62 without a protective sleeve 66 being needed.

Figure 6:
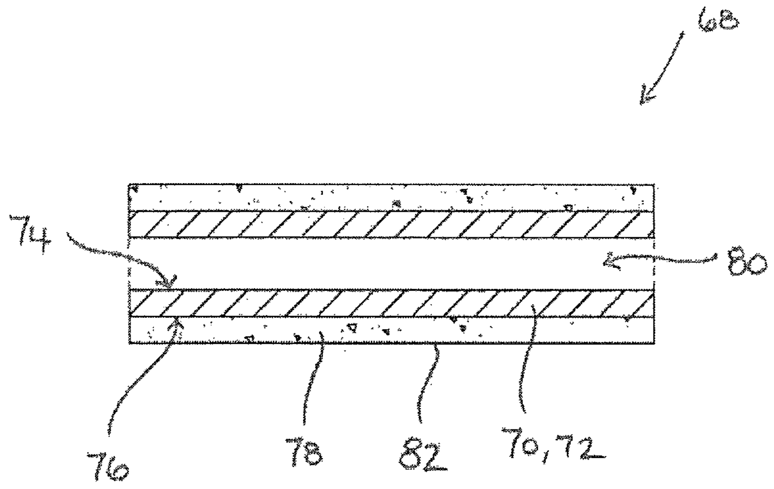
FIG. 6 is a diagrammatic cross-sectional side view of a cartridge having a tubular induction heatable element with flavour-release medium surrounding it.

FIG. 6 shows a cartridge 68 comprising a tubular (possibly cylindrical) induction heatable element 70. The tubular induction heatable element 70 comprises a wall 72 with inner and outer wall surfaces 74, 76 and flavour-release medium 78 is provided exclusively around the outer wall surface 76 to surround the induction heatable element 70. Thus, the interior 80 of the tubular induction heatable element 70 is devoid of flavour-release medium 78.

A thermally-insulating, electrically-insulating and non-magnetic protective sleeve 82, for example in the form of a paper overwrap, surrounds the flavour-release medium 78 and may, advantageously hold it in position, in particular if the flavour-release medium 78 comprises fine pieces or particles of material. In other embodiments, the flavour-release medium 78 can comprise interwoven fibres and this may be sufficient to retain the fibrous flavour-release medium 78 in position around the induction heatable element 70 without a protective sleeve 82 being needed.

In a modified implementation of the cartridge 68 (not illustrated), the tubular induction heatable element 70 includes perforations so that air can flow through the wall 72 between the inner and outer wall surfaces 74, 76.

Figure 7:
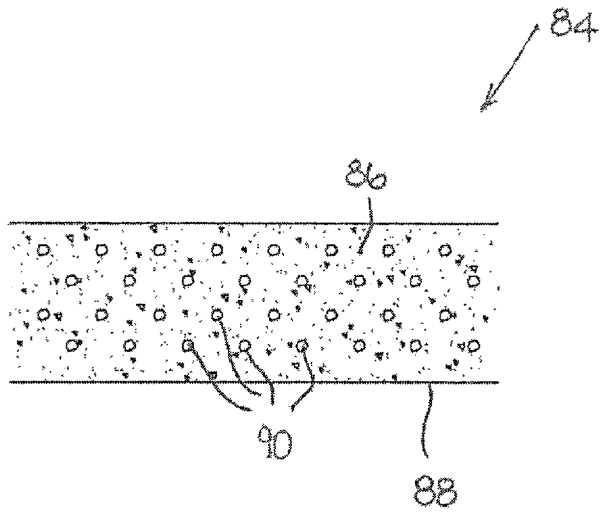
FIG. 7 is a diagrammatic cross-sectional side view of a cartridge in which particulate induction heatable material is dispersed throughout a flavour-release medium.

Referring now to FIG. 7, there is shown a cartridge 84 comprising a flavour-release medium 86 in the form of fine pieces or pellets, particles, flakes or a fibrous form. In the illustrated embodiment, a paper overwrap is provided to act as a protective sleeve 88 but, as described with respect to earlier embodiments, this may be omitted if, for example, the flavour-release medium 86 comprises interwoven fibres or the like which enable it to retain its shape in the absence of the support structure provided by the protective sleeve 88.

The cartridge 84 further comprises an induction heatable material 90 in the form of particles of material which are individually inductively heated in the presence of an electromagnetic field. The particles of the induction heatable material 90 are dispersed throughout the flavour-release medium, typically but not exclusively in a uniform manner.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments. Each feature disclosed in the specification, including the claims and drawings, may be replaced by alternative features serving the same, equivalent or similar purposes, unless expressly stated otherwise.

Although the cartridges 26, 44, 56, 60, 68, 84, have been described for use with the electronic vapour inhalers 10, 110, it will be understood that they can be used with electronic vapour inhalers having alternative configurations.

Although not illustrated, either of the electronic vapour inhalers 10, 110 could be provided with an airflow control mechanism to enable a user to control the airflow through the inlets 38, 116. For example, the airflow control mechanism could comprise means for varying the aperture size of the inlets 38, 116 to restrict the flow of air into the inlets 38, 116.

It may be desirable in any of the aforementioned embodiments to provide a thermally-insulating material between the induction heatable element and the flavour-release medium to reduce the rate of heat transfer to the flavour-release medium.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

Any combination of the above-described features in all possible variations thereof is encompassed by the present invention unless otherwise indicated herein or otherwise clearly contradicted by context.

Further embodiments are described as E1-E43 below:

E1. A cartridge for an electronic vapour inhaler, the cartridge comprising:
an elongate induction heatable element; and
a flavour-release medium adhered to the surface of the elongate induction heatable element.

E2. A cartridge according to embodiment 1, wherein the flavour-release medium is adhered to an outer surface of the elongate induction heatable element.

E3. A cartridge according to embodiment 1 or embodiment 2, wherein the elongate induction heatable element comprises a rod or a wire having a solid cross-section.

E4. A cartridge according to embodiment 1, wherein the elongate induction heatable element comprises a tube having a wall with inner and outer wall surfaces.

E5. A cartridge according to embodiment 4, wherein the flavour release medium is adhered to the inner wall surface.

E6. A cartridge according to embodiment 4 or embodiment 5, wherein the flavour release medium is adhered to the outer wall surface.

E7. A cartridge according to any of embodiments 4 to 6, wherein the tubular induction heatable element comprises one or more openings in the wall to allow air to flow therethrough.

E8. A cartridge according to any preceding embodiment, further comprising a thermally-insulating layer between the induction heatable element and the flavour-release medium.

E9. A cartridge for an electronic vapour inhaler, the cartridge comprising:

an elongate induction heatable element having a solid cross-section; and a flavour-release medium surrounding the elongate induction heatable element.

E10. A cartridge according to embodiment 9, wherein the elongate induction heatable element comprises a rod or a wire.

E11. A cartridge according to embodiment 9 or embodiment 10, wherein the cartridge comprises a protective sleeve surrounding the flavour-release medium.

E12. A cartridge according to embodiment 11, wherein the protective sleeve comprises a thermally-insulating material which is also electrically-insulating and non-magnetic.

E13. A cartridge according to embodiment 11 or embodiment 12, wherein the protective sleeve is tubular and has open ends.

E14. A cartridge according to embodiment 13, wherein the elongate induction heatable element and the tubular protective sleeve are concentric.

E15. A cartridge according to any of embodiments 9 to 14, further comprising a thermally-insulating layer between the induction heatable element and the flavour-release medium.

E1.6. A cartridge for an electronic vapour inhaler, the cartridge comprising:

a tubular induction heatable element; and a flavour-release medium provided exclusively to surround the tubular induction heatable element whereby the interior of the tubular induction heatable element is devoid of said flavour-release medium.

E17. A cartridge according to embodiment 16, wherein the tubular induction heatable element comprises one or more openings in a wall thereof surrounded by the flavour-release medium to allow air to flow through the wall.

E18. A cartridge according to embodiment 16 or embodiment 17, wherein the ca comprises a protective sleeve surrounding the flavour—release medium.

E19. A cartridge according to embodiment 18, wherein the protective sleeve comprises a thermally-insulating material which is also electrically-insulating and non-magnetic.

E20. A cartridge according to embodiment 18 or embodiment 19, wherein the protective sleeve is tubular and has open ends.

E21. A cartridge according to embodiment 20, wherein the tubular induction heatable element and the tubular protective sleeve are concentric.

E22. A cartridge according to any of embodiments 16 to 21, further comprising a thermally-insulating layer between the induction heatable element and the flavour-release medium.

E23. A cartridge for an electronic vapour inhaler, the cartridge comprising a flavour-release medium and an induction heatable material dispersed throughout the flavour-release medium.

E24. A cartridge according to embodiment 23, wherein the induction heatable material is a particulate material.

E25. A cartridge according to embodiment 23 or embodiment 24, wherein the cartridge comprises a protective sleeve surrounding the flavour-release medium and induction heatable material dispersed therein.

E26. A cartridge according to embodiment 25, wherein the protective sleeve comprises a thermally—insulating material which is also electrically-insulating and non-magnetic.

E27. A cartridge according to embodiment 25 or embodiment 26, wherein the protective sleeve is tubular and has open ends.

E28. An electronic vapour inhaler comprising:

a housing having a proximal end and a distal end;

a mouthpiece at the proximal end of the housing;

a cartridge according to any preceding embodiment disposed in the housing; and an induction heating arrangement arranged to inductively heat the induction heatable element and thereby heat the flavour-release medium.

E29. An electronic vapour inhaler according to embodiment 28, wherein the induction heating arrangement comprises an induction coil.

E30. An electronic vapour inhaler according to embodiment 28 or embodiment 29, wherein the housing includes a chamber in which the cartridge is disposed.

E31. An electronic vapour inhaler according to any of embodiments 28 to 30, further including a control arrangement which is adapted to energise the induction heating arrangement to maintain the cartridge substantially at a predetermined temperature.

E32. An electronic vapour inhaler according to embodiment 31, further including a temperature sensor for determining the cartridge temperature, wherein the control arrangement is adapted to energise the induction heating arrangement based on the determined temperature.

E33. An electronic vapour inhaler according to any of embodiments 30 to 32, wherein the housing includes a conduit for delivering heated air to the mouthpiece, the conduit includes at least one first inlet for ambient air and at least one second inlet for heated air from the chamber, the conduit being arranged to provide a venturi effect whereby, in use, the heated air is sucked into the conduit from the chamber by the venturi effect as ambient air flows through the conduit past the at least one second inlet.

E34. An electronic vapour inhaler according to embodiment 33, wherein the conduit is an annular conduit which surrounds the chamber.

E35. An electronic vapour inhaler according to embodiment 34, wherein the annular conduit includes a plurality of circumferentially spaced first inlets formed in the housing and a plurality of circumferentially spaced second inlets formed in a circumferential wall of the chamber.

E36. An electronic vapour inhaler comprising:
- a housing having a mouthpiece at one end;
- an induction heating arrangement arranged to inductively heat an induction heatable element of a cartridge or capsule inserted into the housing to heat a flavour-release medium within the cartridge or capsule;
- a control arrangement which is arranged to energise the induction heating arrangement to inductively heat the induction heatable element and thereby heat the flavour-release medium;
- the control arrangement being further arranged to recognise an inserted capsule or cartridge by detecting a characteristic of the induction heatable element and to control the operation of the induction heating arrangement based on the detected characteristic.

E37. An electronic vapour inhaler according to embodiment 36, wherein the control arrangement is arranged to control the operation of the induction heating arrangement to provide a predetermined heating profile.

E38. An electronic vapour inhaler according to embodiment 36 or embodiment 37, wherein the control arrangement is arranged to detect a change in the electromagnetic field generated by the interaction between the induction heatable element and the induction heating arrangement during insertion of a capsule or cartridge into the housing.

E39. An electronic vapour inhaler according to any of embodiments 36 to 38, wherein the induction heating arrangement comprises an induction coil.

E40. An electronic vapour inhaler according to any of embodiments 36 to 39, wherein the housing includes a chamber in which the cartridge is disposed.

E41. An electronic vapour inhaler according to any of embodiments 36 to 40, wherein the cartridge is as defined in any of embodiments 1 to 27.

E42. A cartridge for an electronic vapour inhaler substantially as hereinbefore described and/or as shown in any one or more of the accompanying drawings.

E43. An electronic vapour inhaler substantially as hereinbefore described and/or as shown in FIG. 1 or FIG. 1*a* of the accompanying drawings.

The invention claimed is:

1. An electronic vapour inhaler, comprising:
- a chamber configured so that a user can place a cartridge into said chamber;
- an induction coil arranged to extend around the chamber;
- a temperature sensor configured to measure a temperature inside the chamber; and
- a control arrangement arranged to control operation of the induction coil based on the temperature measured by the temperature sensor to maintain a predetermined temperature inside the chamber.

2. The electronic vapour inhaler of claim 1, wherein the induction coil is configured to heat an induction heatable element and a flavour release medium inside the chamber, thereby heating air flowing through said flavour release medium in the chamber when a user inhales and draws ambient air through air inlets into the chamber.

3. The electronic vapour inhaler of claim 1, wherein the control arrangement includes a temperature selector to allow a user to select a desired vapour inhalation temperature.

4. The electronic vapour inhaler of claim 1, wherein the control arrangement is arranged to control operation of the induction coil so that the induction coil is energised in such a way that the temperature inside the chamber decreases between inhalation cycles and increases immediately before or at a start of an inhalation cycle.

5. The electronic vapour inhaler of claim 1, wherein the control arrangement is arranged to maintain the predetermined temperature as a substantially constant temperature.

6. The electronic vapour inhaler of claim 1, wherein the control arrangement is a microprocessor.

7. The electronic vapour inhaler of claim 1, further comprising a power source arranged to energise the induction coil.

8. The electronic vapour inhaler of claim 7, wherein the power source comprises one or more batteries.

9. The electronic vapour inhaler of claim 8, wherein the one or more batteries are inductively chargeable.

10. The electronic vapour inhaler of claim 1, further comprising a cover being removable so that the chamber can be accessed for removing a cartridge from the chamber and/or placing a cartridge in the chamber.

11. A kit comprising:
- the electronic vapour inhaler of claim 1; and
- a pre-manufactured cartridge.

12. A kit comprising:
- the electronic vapour inhaler of claim 1; and
- a pack of pre-manufactured cartridges.

13. An electronic vapour inhaler, comprising:
- a chamber configured so that a user can place a cartridge into said chamber;
- an induction coil arranged to extend around the chamber;
- a temperature sensor configured to measure a temperature inside the chamber;
- a microprocessor arranged to control operation of the induction coil based on the temperature measured by the temperature sensor to maintain a predetermined temperature inside the chamber; and
- a power source arranged to energise the induction coil.

14. An electronic vapour inhaler, comprising:
- a housing including a chamber configured to receive a cartridge;
- an induction coil arranged to extend around the chamber;
- a temperature sensor to determine a temperature inside the chamber; and
- a control arrangement arranged to control operation of the induction coil based on the temperature determined by the temperature sensor to maintain the cartridge at a predetermined temperature.

15. The electronic vapour inhaler of claim 14, wherein the temperature sensor is a thermocouple, a resistance temperature detector, a thermistor or an infra-red sensor.

16. The electronic vapour inhaler of claim 14, wherein the control arrangement includes a temperature selector to allow a user to select a desired vapour inhalation temperature.

17. The electronic vapour inhaler of claim 14, wherein the control arrangement is arranged to control operation of the induction coil so that the induction coil is energised in such a way that the temperature inside the chamber decreases between inhalation cycles and increases immediately before or at a start of an inhalation cycle.

18. The electronic vapour inhaler of claim 14, wherein the housing includes an air inlet through which air can flow into the chamber.

19. The electronic vapour inhaler of claim 18, wherein the temperature sensor is arranged to measure a temperature of airflow into the chamber through the air inlet and determine the temperature inside the chamber as a function of the measured air inlet temperature, properties of the cartridge, and an amount of energy supplied by the induction coil.

20. The electronic vapour inhaler of claim 1, wherein the induction coil is embedded in a circumferential wall that surrounds the chamber.

* * * * *